(12) United States Patent
Lan et al.

(10) Patent No.: US 9,128,708 B2
(45) Date of Patent: Sep. 8, 2015

(54) POWER SAVING METHOD AND SYSTEM APPLIED IN OPTICAL DISK DRIVE

(75) Inventors: Kuo-jung Lan, Jhonghe (TW); Hao-hui Yin, Hsinchu (TW); Chih-chung Wu, Pingtung (TW); Tysh-bin Liu, Hsinchu County (TW)

(73) Assignee: MEDIATEK INC., Hsin-Chu (TW)

( * ) Notice: Subject to any disclaimer, the term of this patent is extended or adjusted under 35 U.S.C. 154(b) by 246 days.

(21) Appl. No.: 13/440,291

(22) Filed: Apr. 5, 2012

(65) Prior Publication Data

US 2012/0188861 A1 Jul. 26, 2012

Related U.S. Application Data

(63) Continuation-in-part of application No. 11/555,543, filed on Nov. 1, 2006, now Pat. No. 8,154,960.

(51) Int. Cl.
*G11B 7/00* (2006.01)
*G06F 1/32* (2006.01)
*G11B 19/02* (2006.01)

(52) U.S. Cl.
CPC ............ *G06F 1/3203* (2013.01); *G06F 1/3268* (2013.01); *G11B 19/02* (2013.01); *Y02B 60/1246* (2013.01)

(58) Field of Classification Search
None
See application file for complete search history.

(56) References Cited

U.S. PATENT DOCUMENTS

| | | | |
|---|---|---|---|
| 5,799,199 A | 8/1998 | Ito et al. | |
| 6,269,061 B1 | 7/2001 | Shimizume et al. | |
| 6,535,470 B1 * | 3/2003 | Wu | 369/53.3 |
| 6,799,242 B1 | 9/2004 | Tsuda et al. | |
| 2005/0019022 A1 | 1/2005 | Lee | |
| 2005/0204175 A1 | 9/2005 | Burton | |
| 2006/0123259 A1 * | 6/2006 | Yokota et al. | 713/320 |

FOREIGN PATENT DOCUMENTS

EP 0649131 A2 4/1995

* cited by examiner

*Primary Examiner* — Joseph Haley

(57) ABSTRACT

A power saving method and a power saving system are applied in an optical disk drive. The power saving system comprises a power controlling unit for differentiating the specific sets of circuits not being used at a specific operation rate and powering them down. The sets of circuits not being used will be powered up while the associated operation rate at which they are required to operate is nearly started.

6 Claims, 14 Drawing Sheets

POWER SAVING METHOD AND SYSTEM APPLIED IN OPTICAL DISK DRIVE

CROSS REFERENCE

The present application is a Continuation-in-part of U.S. patent application Ser. No. 11/555,543, filed Nov. 1, 2006, which is all incorporated by reference herein.

FIELD OF THE INVENTION

The present invention generally relates to a power saving method and a power saving system applied in an optical disk drive, and more particularly, to a power saving method and system for powering down the circuits not being used during the operation of the optical disk drive.

BACKGROUND OF THE INVENTION

As the development of the portable electronic products, the requirements for power saving are more and more critical. For a notebook personal computer (NB, or called laptop PC), each component is required to consume power as less as possible so as to save the power of a battery used in the NB.

Similarly, the optical disk drive used in the notebook PC is also required to diminish its power consumption. Conventional optical disk drive only stops the spindle motor while the optical disk drive is not reading or writing an optical disk to reduce the power consumption. However, the conventional optical disk drive supplies power to all circuits of chip(s) thereof all the time, no matter being used or not.

The operation of the optical disk drive can be divided into several operation modes, and each mode is executed by some specific circuits in a control chip. When the optical disk drive is operated in a specific mode, only some circuits in the control chip are used, the other circuits not used in this mode can be powered down without effecting the normal operation of the optical disk drive.

Accordingly, the circuits not being used in the chip can be powered down for reducing the power consumption of the optical disk drive when the optical disk drive is operated in a specific operation mode. Therefore, the portable electronic product which comprises an optical disk drive can maximally save power by reducing the power consumption of the optical disk drive thereof.

SUMMARY OF THE INVENTION

A primary objective of the present invention is to provide a power saving method applied in an optical disk drive. The power saving method is capable of reducing the power consumption of the optical disk drive by powering down the circuits not being used during the operation of the optical disk drive.

The present invention sets forth a power saving method and a power saving system applied in an optical disk drive. The power saving system comprises a central processing unit, a spindle motor, an optical pick-up unit, an analog portion of control circuits and a digital portion of control circuits. Each of the analog or digital portions of control circuits can be divided into several sets of control circuits. Each set of control circuits is related to an operation mode of the optical disk drive. The power saving system further comprises a power controlling unit for differentiating the sets of control circuits not being used in the specific operation mode and powering them down. Those powered-down sets of control circuits will be powered up when an operation mode in which they are required to operate is nearly started.

The power saving method comprises following steps of:

Step 1 Starting a power control procedure.

Step 2 A power controlling unit receives a command related to a first operation mode. The command may be a Seek command and the first operation mode may be a Seek mode, for example. The operation mode and the corresponding command could be related to a Seek mode, a Following mode, a Long-Seek mode, a Short-Seek mode, a Data-Reading mode or a Data-Writing mode.

Step 3 The power controlling unit issues a power up signal to power up the first set of control circuits related to the first operation mode in order to be ready for starting the first operation mode.

Step 4 The power controlling unit issues a power down signal to power down the first set of rest circuits is not used in the first operation mode.

Step 5 Starting to execute the first operation mode when the first set of circuits powered up.

Step 6 The power controlling unit monitors the schedule of first operation mode. The power control procedure will go forward to the step Step 8 if the power controlling unit finds that the first operation mode is nearly finished, otherwise the power controlling unit monitors the schedule of first operation mode continuously.

Step 7 The second set of control circuits related to the second operation mode are powered up by the power controlling unit in order to be ready for starting the second operation mode.

Step 8 The second set of rest circuits are not used in the second operation mode are powered down by the power controlling unit when the first operation mode is finished, and the power control procedure goes back to Step 2.

In Step 4, the time point for powering down the first set of rest circuits not being used in the first operation mode can be determined by delaying a predetermined period from the time point of issuing the power up signal to power up the first set of control circuits related to the first operation mode. Therefore, the first set of rest circuits not being used in the first operation mode are powered down after the predetermined period ends. In other words, the second operation mode is finished before or when the predetermined period ends. The predetermined period can be predetermined according to the length of warm-up time of first set of control circuits related to the first operation mode. Alternatively, the time point for powering down the first set of rest circuits not being used in the first operation mode can be determined when the power controlling unit receives a signal for indicating that the first operation mode is actually started.

The present invention provides the power saving system and method applied in an optical disk drive. The power saving system and method of the present invention are adapted for powering down at least a set of control circuits not being used during a specific operation mode of the optical disk drive without effecting the normal operation of the optical disk drive. Therefore, the power saving system and method according to the present invention are capable of reducing the power consumption of the optical disk drive.

DETAILED DESCRIPTION OF THE PREFERRED EMBODIMENTS

The present invention is directed to a power saving method and a power saving system applied in an optical disk drive. The power saving method and the power saving system in accordance with the present invention are capable of powering down the specific set of control circuits not being used during the operation of the optical disk drive.

Figure 1:
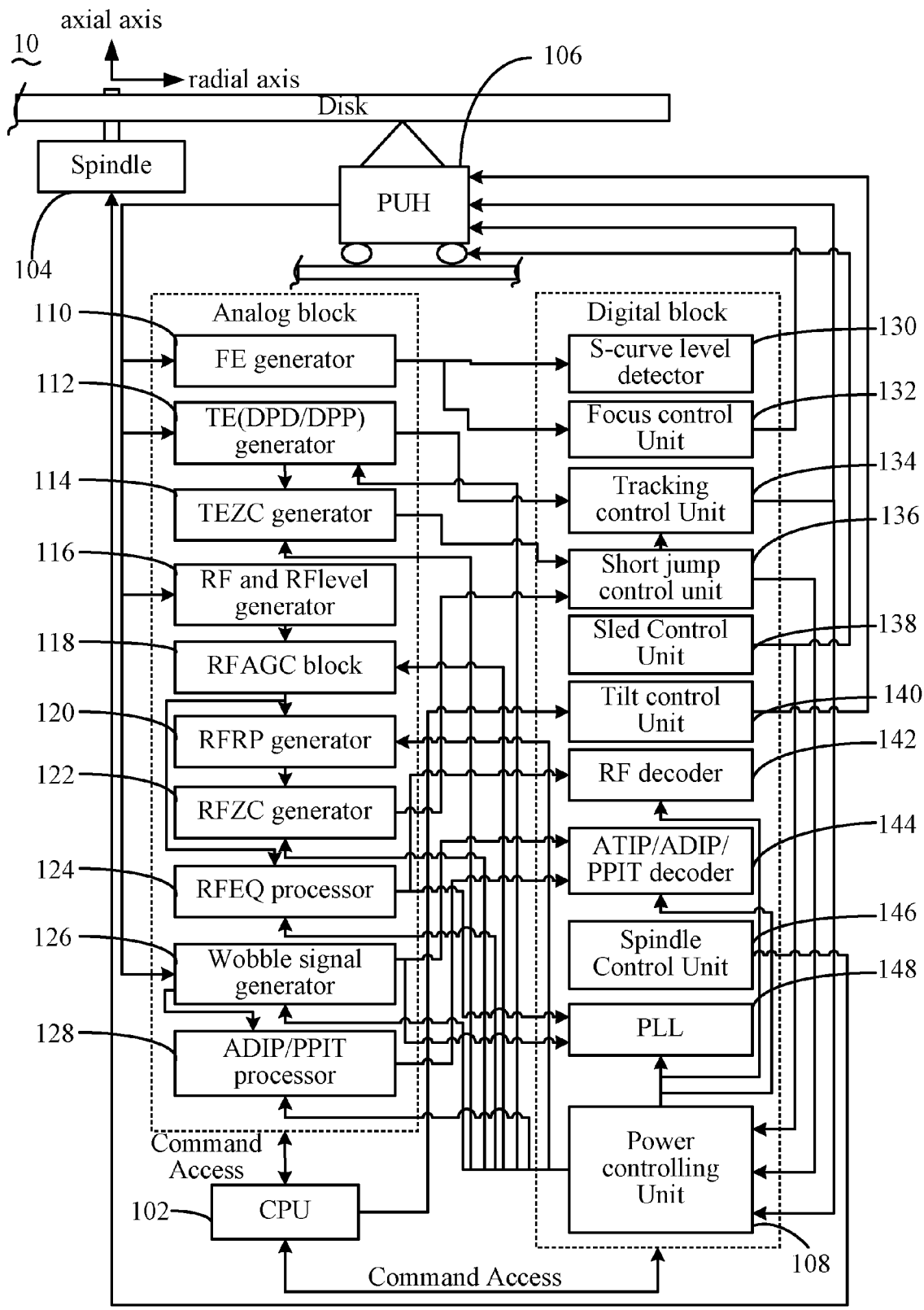
FIG. 1 illustrates a block diagram of a power saving system applied in an optical disk drive according to the present invention.

FIG. 1 illustrates a block diagram of a power saving system applied in an optical disk drive according to the present invention. The power saving system 10 comprises a central processing unit (CPU) 102, a spindle motor (spindle) 104 and an optical pick-up unit (PUH) 106. The power saving system 10 further comprises an analog portion of control circuits and a digital portion of control circuits. The analog portion of control circuits includes several circuits, such as an FE generator 110, a TE(DPD/DPP) generator 112, a TEZC generator 114, an RF and RF level generator 116, an RFAGC block 118, an RFRP generator 120, an RFZC generator 122, an RFEQ processor 124, a wobble signal generator 126 and an ADIP/PPIT processor 128. The digital portion of control circuits includes several circuits, such as a power controlling unit 108, an S-curve level detector 130, a focus control unit 132, a tracking control unit 134, a short jump control unit 136, a sled control unit 138, a tilt control unit 140, an RF decoder 142, an ATIP/ADIP/PPIT decoder 144, a spindle control unit 146 and a phase lock loop (PLL) 148. Please note that, the digital portion and the analog portion mentioned above are just the embodiments of the present invention. The circuits in the analog portion maybe designed as digital circuit and classified into digital portion in other embodiments, and the circuits in the digital portion maybe designed as an analog circuit and classified into analog portion in other embodiments. All kinds of circuit that can be powered up or powered down should be included into the present invention.

As known, an optical disk drive includes several operation modes for executing a completed reading or writing operation. The optical disk drive activates different sets of control circuits in different operation modes. TABLE 1 illustrates the different operation modes of the optical disk drive. The whole operation of an optical disk drive can be mainly divided into two operation modes, e.g. a Seek mode and a Following mode. Furthermore, the Seek mode can be subdivided into two sub-operation modes, e.g. a Sled Follow Lens Kick mode (Short Seek mode) and a Sled Move mode (Long Seek mode). And, the Following mode can be subdivided into two sub-operation modes, e.g. a Data-Reading mode and a Data-Writing mode.

TABLE 1

| Operation modes of optical disk drive Operation Modes of Optical Disk Drive | | | |
| --- | --- | --- | --- |
| Seek Mode | | Following Mode | |
| Sled Follow Lens Kick (Short Seek) Mode | Sled Move (Long Seek) Mode | Data-Reading Mode | Data-Writing Mode |

In each sub-operation mode, there are corresponding sets of control circuits operate. The sets of control circuits not being used in this sub-operation mode (or operation mode) can be powered down during the period that the sub-operation mode is executed. TABLE 2 illustrates the sets of control circuits not being used in the respective operation modes.

TABLE 2

| The sets of control circuits not being used in Seek or Following modes | | | | |
| --- | --- | --- | --- | --- |
| | Seek Mode | | Following Mode | |
| | Short Seek Mode | Long Seek Mode | Data-Reading Mode | Data-Writing Mode |
| ROM Disk | RFEQ processor, RFAGC block, RF decoder, PLL | RFEQ processor, RFAGC block, RF decoder, PLL, TE(DPD or DPP), RFRP | RFRP generator, RFZC generator, TEZC generator | None |
| Recordable Disk | RFEQ processor, RFAGC block, RF decoder, PLL, wobble signal generator, ADIP/PPIT/ATIP decoder, ADIP/PPIT processor | RFEQ processor, RFAGC block, TE(DPD or DPP) generator, RFRP generator, RF decoder, PLL, wobble signal generator, ADIP/PPIT/ATIP decoder, ADIP/PPIT processor | RFRP generator, RFZC generator, TEZC generator | RFRP generator, RFZC generator, TEZC generator, RFEQ processor, RFAGC block |

The sets of control circuits not being used can be powered down in a specific operation mode for saving the power consumption. For example, the RFEQ processor, RFAGC block, TE (DPD or DPP) generator, RFRP generator, RF decoder, PLL, wobble signal generator, ADIP/PPIT/ATIP decoder and ADIP/PPIT processor can be powered down without effecting the normal operation of an optical recordable drive while the optical recordable drive is in the Long Seek Mode.

Figure 2:
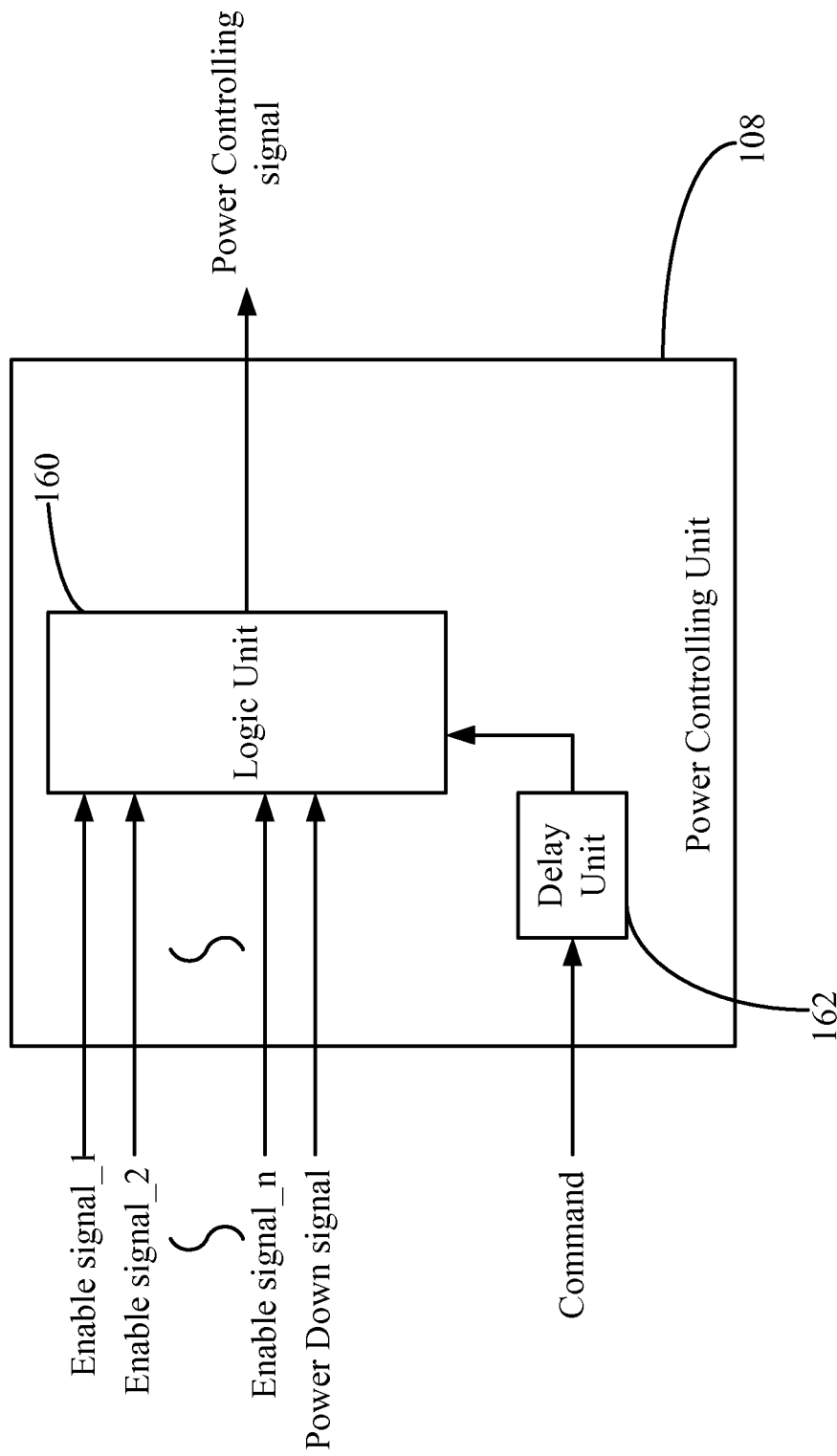
FIG. 2 illustrates a schematic diagram of the power controlling unit.

FIG. 2 shows a schematic diagram of the power controlling unit 108. The power controlling unit 108 is capable of respectively controlling the power states of different sets of control circuits. The power state means that the corresponding set of control circuits is powered up or powered down. The power controlling unit 108 comprises a logic unit 160. The power down logic of the power saving system 10 is designed and set in the logic unit 160 in advance. The logic unit 160 can differentiate the power down signals of different operation modes and output a power controlling signal to power down the sets of control circuits not being used. The power controlling unit 108 may further comprise a delay unit 162 which is used to delay some specific commands inputted into the logic unit 160 for delaying the time of powering down some sets of control circuits. On the other word, the power controlling unit 108 is capable of warming up the circuits should be used in the oncoming operation mode. The delay unit 162 can be controlled by the logic unit 160. Alternatively, the operating mechanism of delay unit 162 can be included in the power down logic of the power saving system 10. The logic unit 160 determines to power down which sets of control circuits not being used according to an oncoming operation mode of the power saving system 10. The logic unit 160 may be realized by a combination of a plurality of logic gates. The logic unit 160 may also be realized by a firmware-based or a software-based structure.

Figure 3:
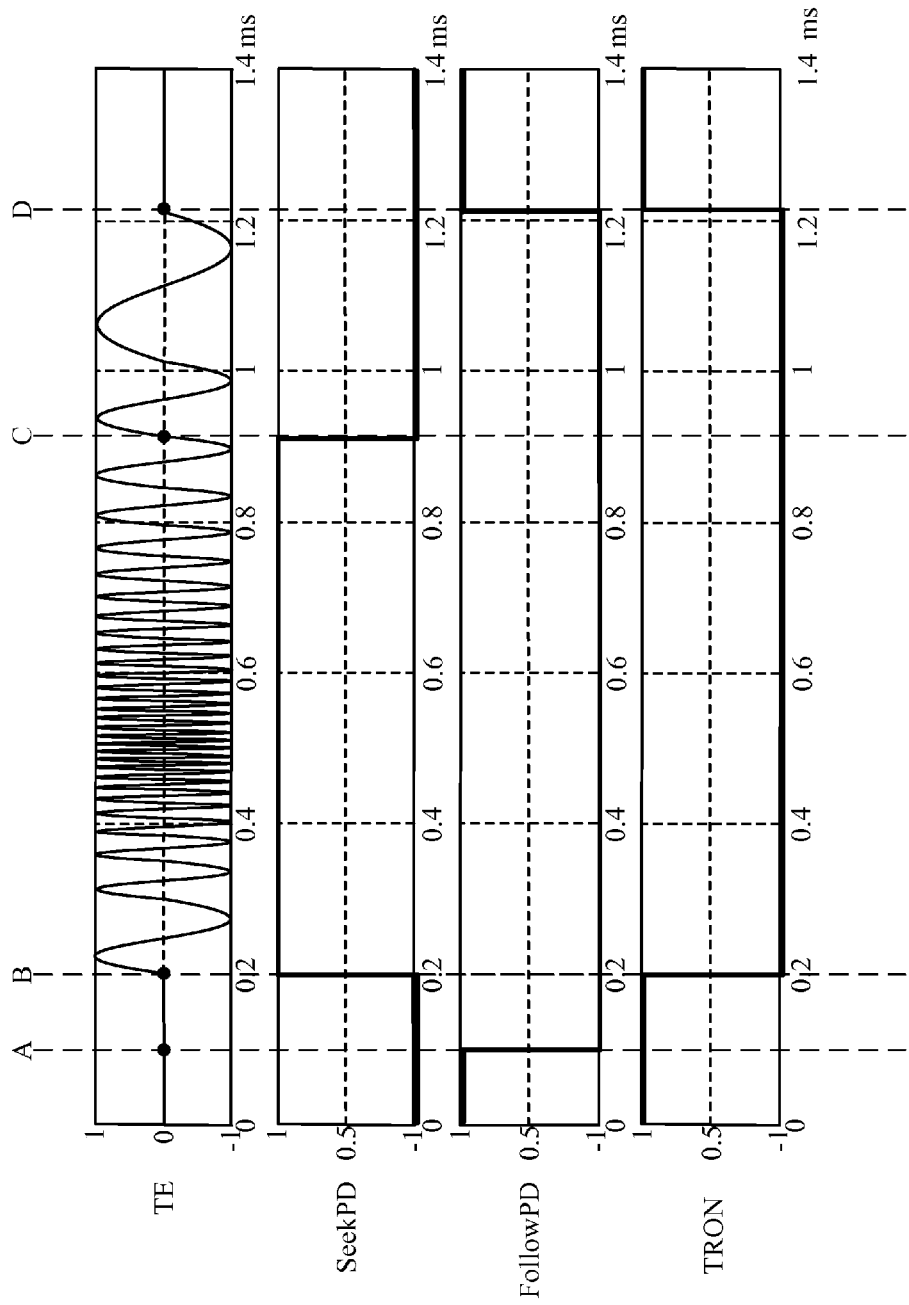
FIG. 3 illustrates an embodiment of the power down signals in different operation modes of the power saving system according to the present invention.
Figure 4A:
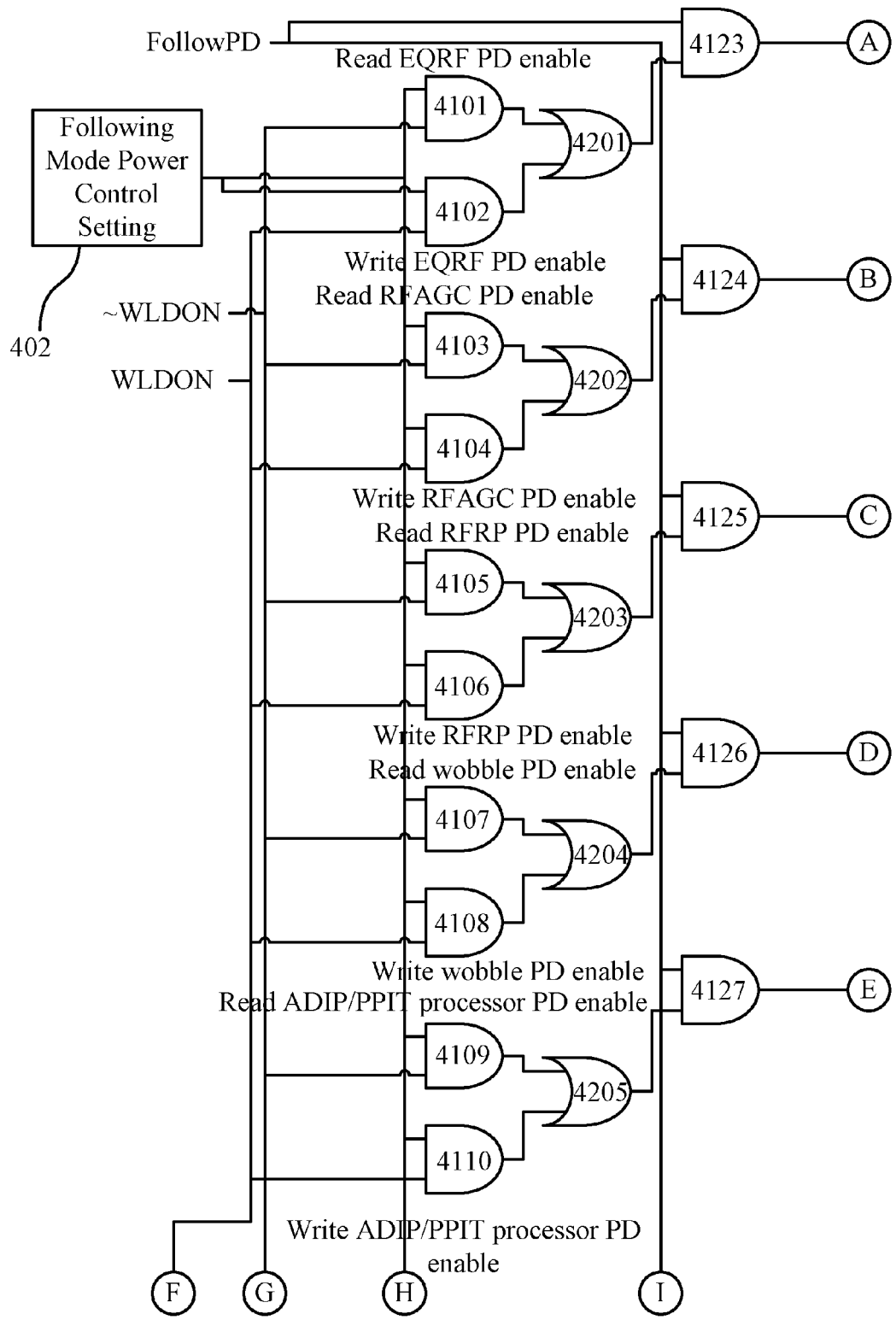
FIGS. 4a-4d show an embodiment of detailed structure of logic unit.
Figure 4B:
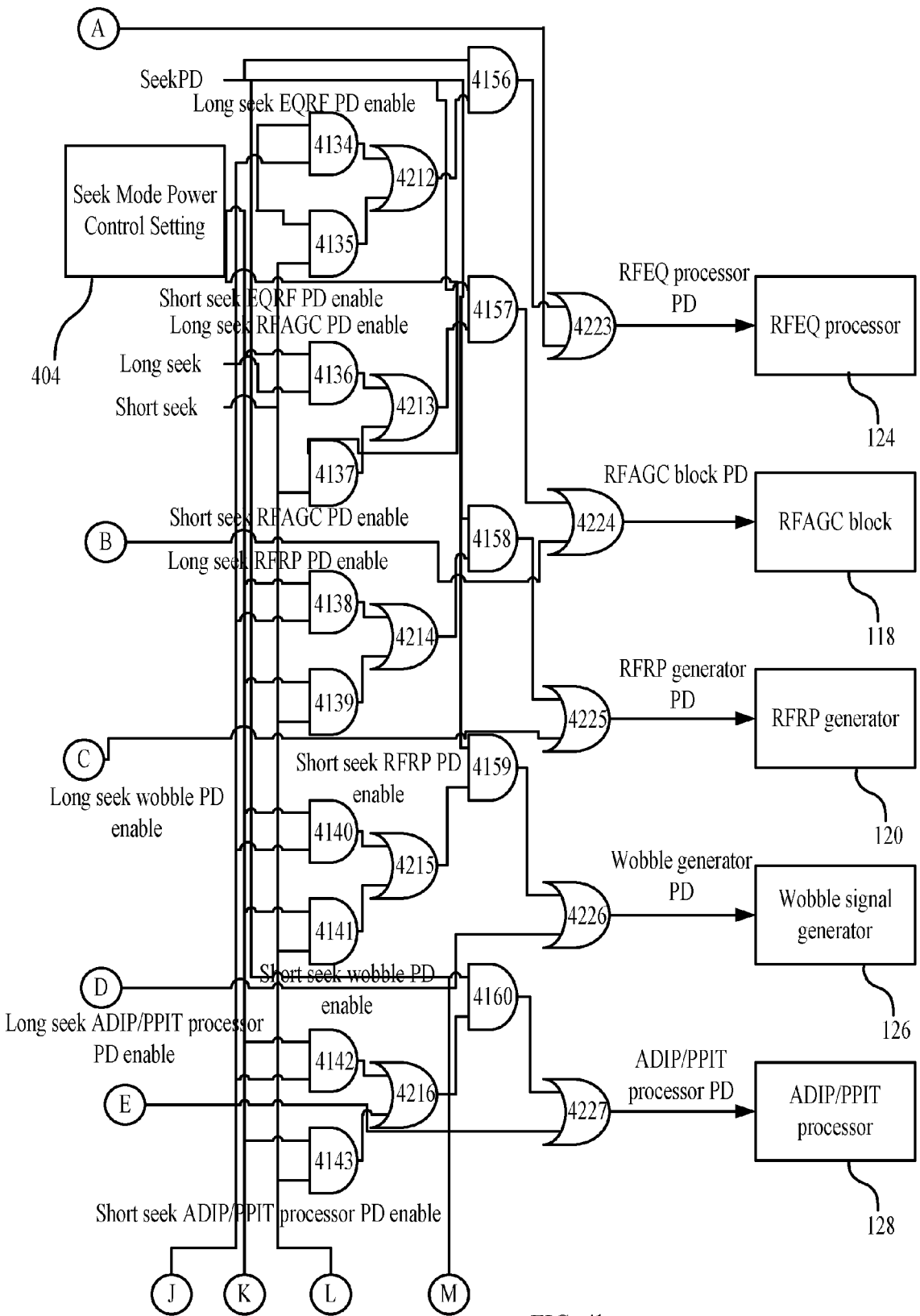
Figure 4C:
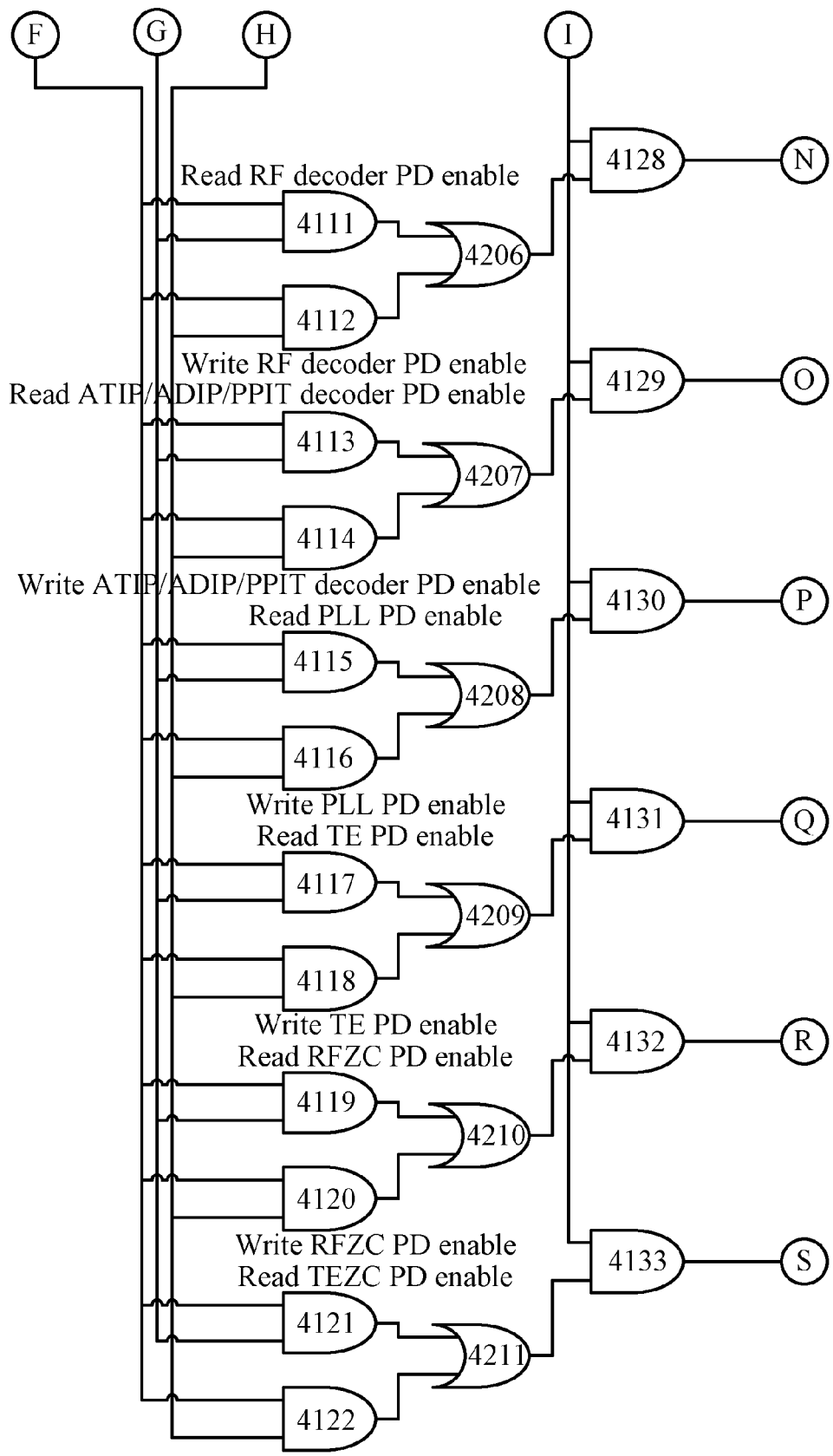
Figure 4D:
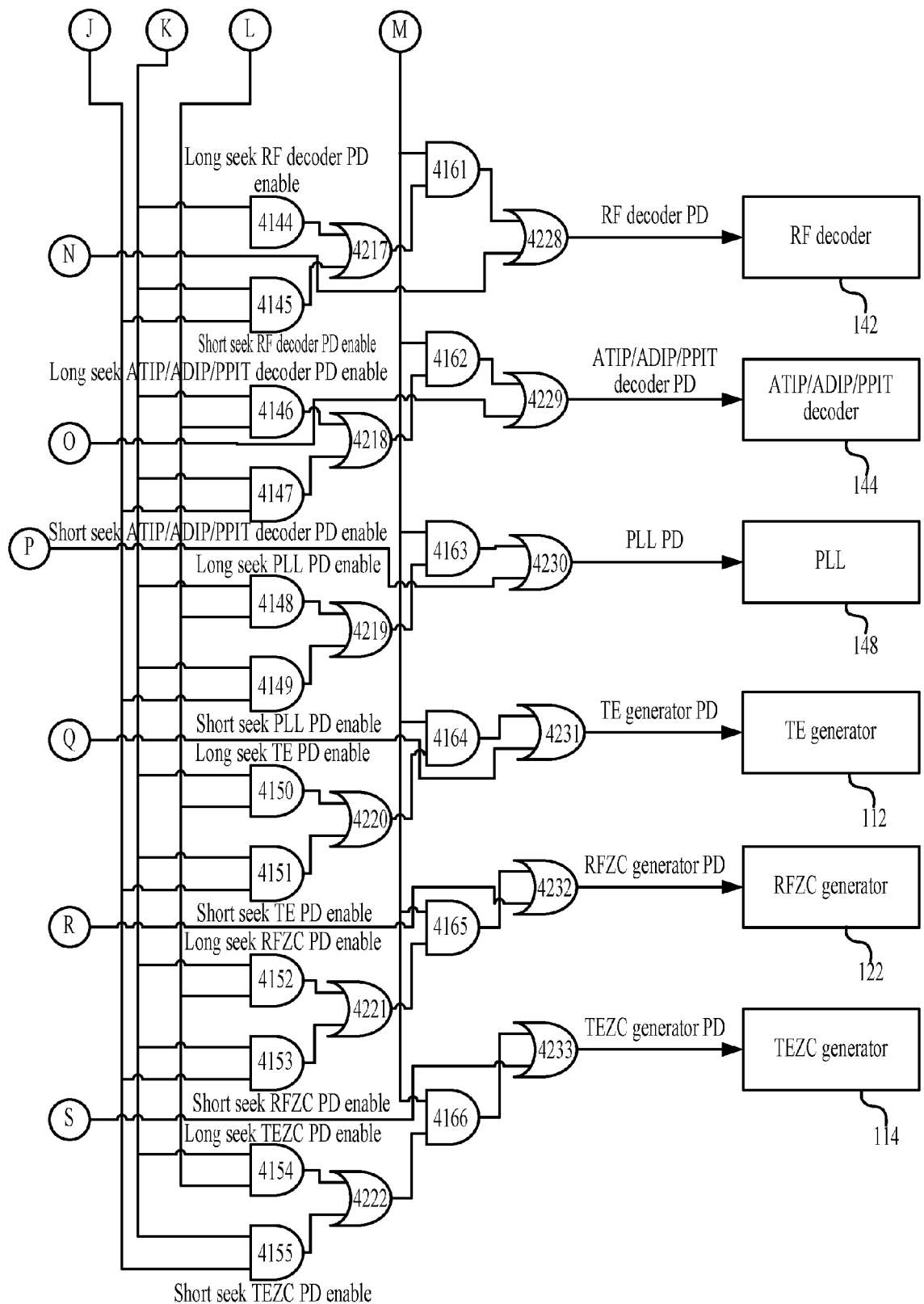

Please refer to FIG. 3. FIG. 3 illustrates the power down signals in different operation modes of the power saving system 10. The high level of Seek PD (seek power down) signal means that the circuits not useful in Seek mode is powered down, contrarily, the low level of Seek PD signal means that the circuits not useful in Seek mode is powered up. Similarly, the high level of Follow PD signal means that the circuits not useful in Following mode is powered down, and the low level of Follow PD signal means that the circuits not useful in Following mode is powered up. During the interval from time point A to B, Follow PD signal pulled low means that the power saving system 10 starts to power up the related sets of control circuits which are not useful in Following mode but is needed in the Seek mode. The Seek mode operation is ready for executing at time point A. At the moment when Seek PD signal is rising, the sets of control circuits not used in the Seek mode will be powered down, such as the related sets of control circuits only used in the Following mode. In the interval from time point B to C, the power saving system 10 enters into the Seek mode at time point B. At the same time, the related sets of control circuits only used in the Following mode will be powered down. Although the Seek mode starts at time B, the related sets of control circuits of Seek mode are powered up at time A in advance under consideration to the inherent warm-up time of the circuits. Similarly, the circuits used in Following mode are powered up again at time C before the Seek mode is finished. The sets of control circuits used in Seek mode will be powered down again at time point D when Follow PD signal is rising, because the Seek mode is finished. In other words, the power saving system 10 enters into the Following mode again at time point D.

It should be noted that the warm-up time of circuit depends on the inherent characteristic of the specific circuit. The specific circuit should be powered up before associated operation mode starts in order to maintain the smooth operation of the optical disk drive. The problem of warm-up time of circuit can be overcome by advancing the powering up a predetermined period of time, such as the time interval from A to B. Alternatively, it can be done by counting the remaining tracks for short seek mode, such as the time interval from C to D. Additionally, the warm-up time of circuit can be achieved by counting the remaining steps for long seek mode.

FIGS. 4a-4d show an embodiment of detailed structure of logic unit 160. The logic unit 160 can be realized by combining a plurality of logic gates for determining which set of circuits should be powered down according to different power controlling signals. The logic gates of logic unit 160 are arranged in accordance with a predetermined power controlling setting, such as Following Mode Power Control Setting 402 and Seek Mode Power Control Setting 404. The predetermined power controlling setting determines the power states of different sets of circuits in the optical disk drive 10 according to different power controlling signals, such as FollowPD, SeekPD signals, different enable signals etc. For example, if FollowPD signal is in logic "1" state and Read RFEQ PD enable is in logic "1" state, AND gate 4101 will output logic "1" signal to OR gate 4201, OR gate 4201 will output logic "1" signal to AND gate 4123, then AND gate 4123 will output logic "1" signal to OR gate 4223. Finally, OR gate 4223 will output a RFEQ processor PD signal to the RFEQ processor 124 for powering down thereof. Accordingly, any set of circuits can be powered down according to different power controlling signals which are preset in the Following Mode Power Control Setting 402 and Seek Mode Power Control Setting 404. It should be noted that this topology of arrangement of logic gates in logic unit 160 is just one embodiment for exemplifying the detailed structure of logic unit 160. The arrangement of logic gates in logic unit 160 also can be realized in another arrangement of logic gates.

Figure 5A:
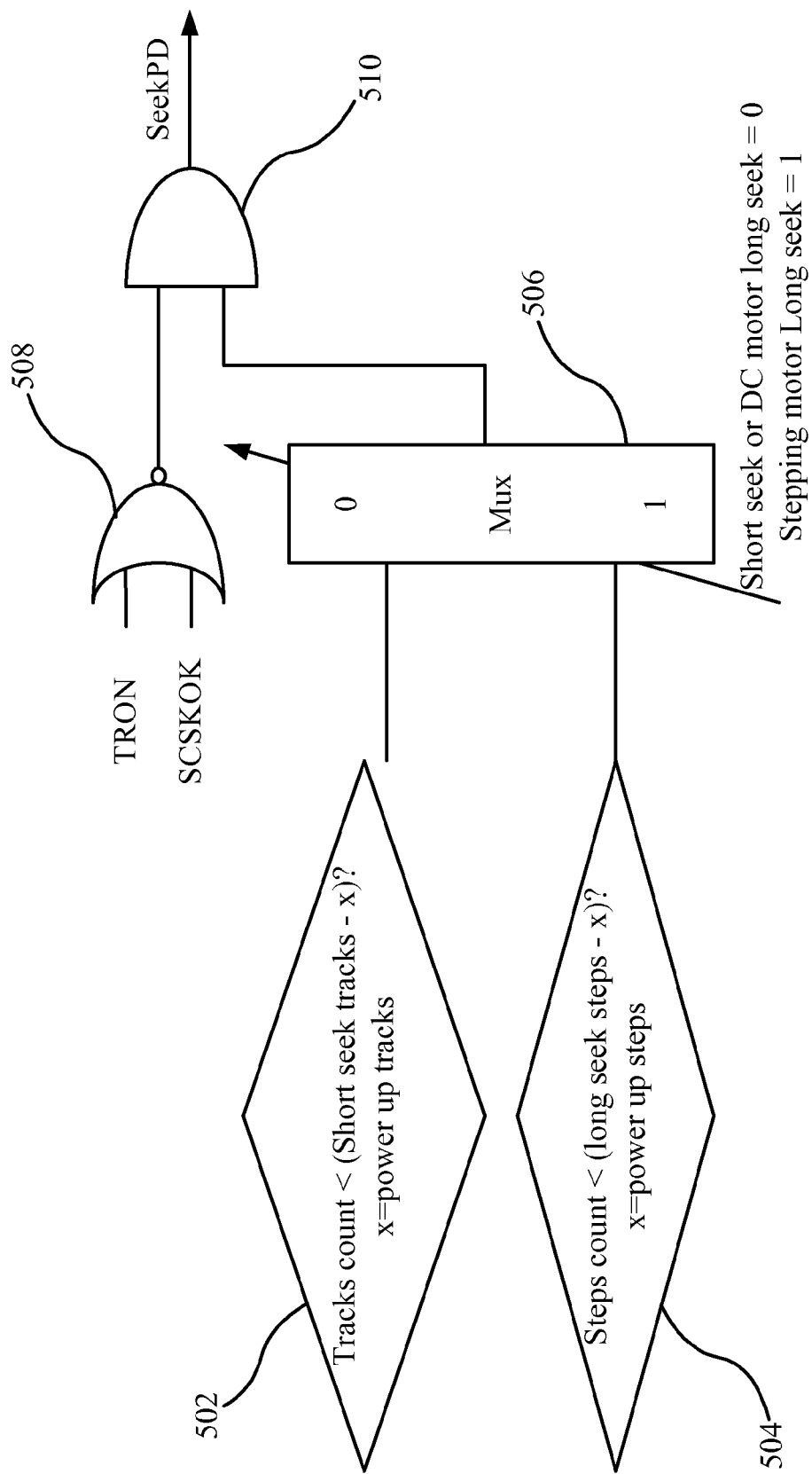
FIGS. 5a and 5b show a structure of determination rule for determining which power controlling signal should be outputted.
Figure 5B:
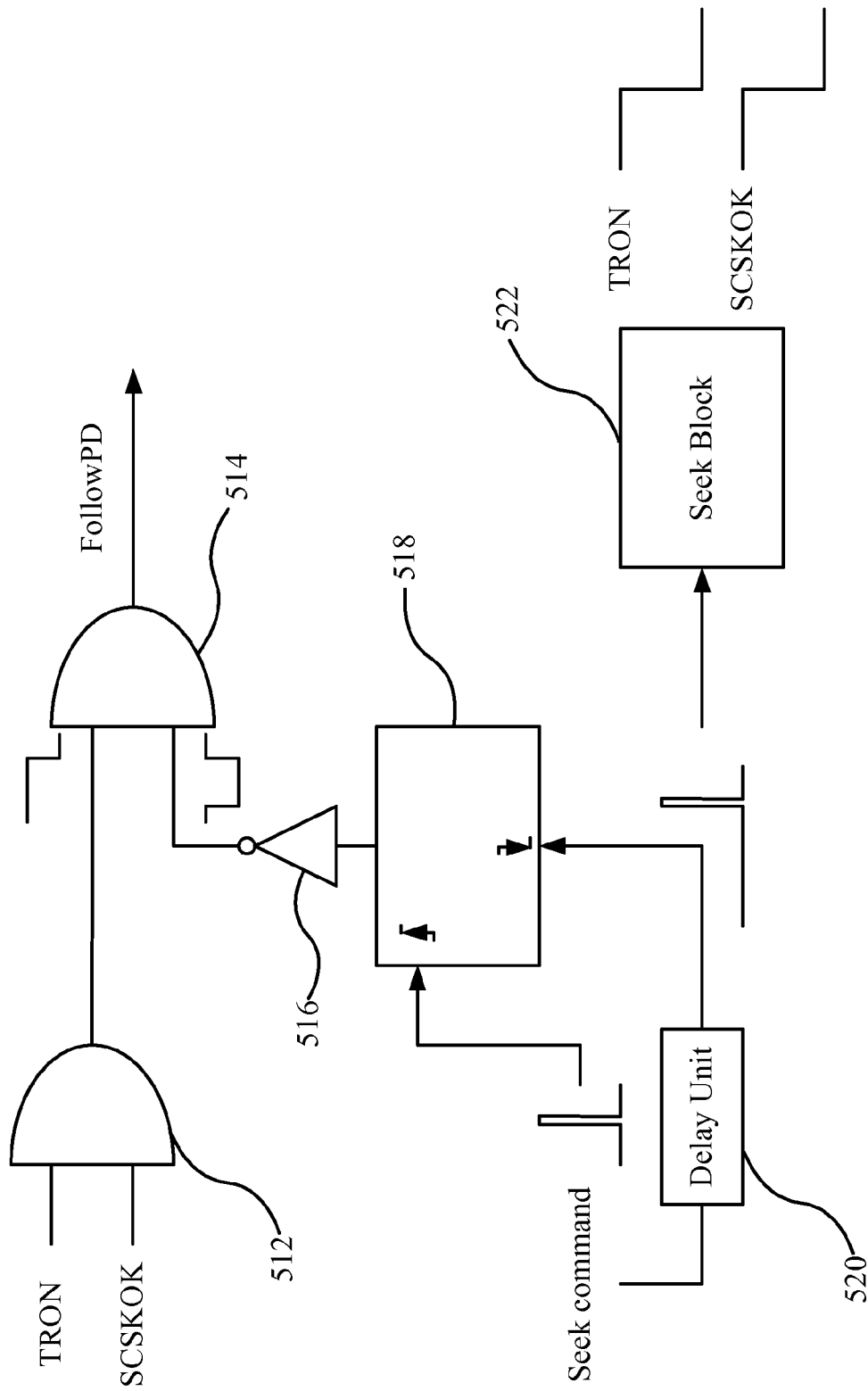

FIGS. 5a-5b show a structure of determination rule for determining which power controlling signal should be outputted. For example, a SeekPD signal can be determined according to the logic states of TRON signal, SCSKOK signal and the number of remaining tracks or remaining steps. Similarly, a FollowPD signal also can be determined according to the logic states of TRON signal, SCSKOK signal and a Seek command. In the embodiment of Seek PD signal, for example, if TRON and SCSKOK signal are all in logic "0" state and Stepping motor Long Seek signal is in logic "1" state, the NOR gate 508 and the multiplexer 506 both output logic "1" signal, then the AND gate 510 will output a SeekPD signal to power down corresponding set of circuits. In the embodiment of Follow PD signal, contrarily, if TRON and SCSKOK signal are all in logic "1" state and Seek command is in logic "0" state, the AND gate 512 and inverter 516 both output logic "1" signal, then the AND gate 514 will output a FollowPD signal to power down corresponding set of circuits. If the Seek command is in the logic "1" state, the High-Low element 518 outputs a logic "1" signal and the inventor 516 outputs a logic "0" signal, then the AND gate 514 outputs a logic "0" state signal. In the meantime, the delay unit 520 delays the Seek command for a predetermined period and then inputs the Seek command to the Seek Block 522 to make the TRON and SCSKOK signal all in logic "0" state. The delay unit 520 also outputs the delay Seek command to the High-Low element 516 to make the High-Low element output a logic "0" state signal to the inverter 516. Then the AND gate 512 outputs a logic "0" signal and the inverter 516 outputs logic "1" signal to make the AND gate 514 output a logic "0" signal. Said delay unit 520 delays the seek command for a predetermined time that could be a warm-up time for seeking circuits. It also should be noted that structure of determination rule of power controlling signal can be realized by other structures which are conformed to the spirit of the present invention.

Figure 6:
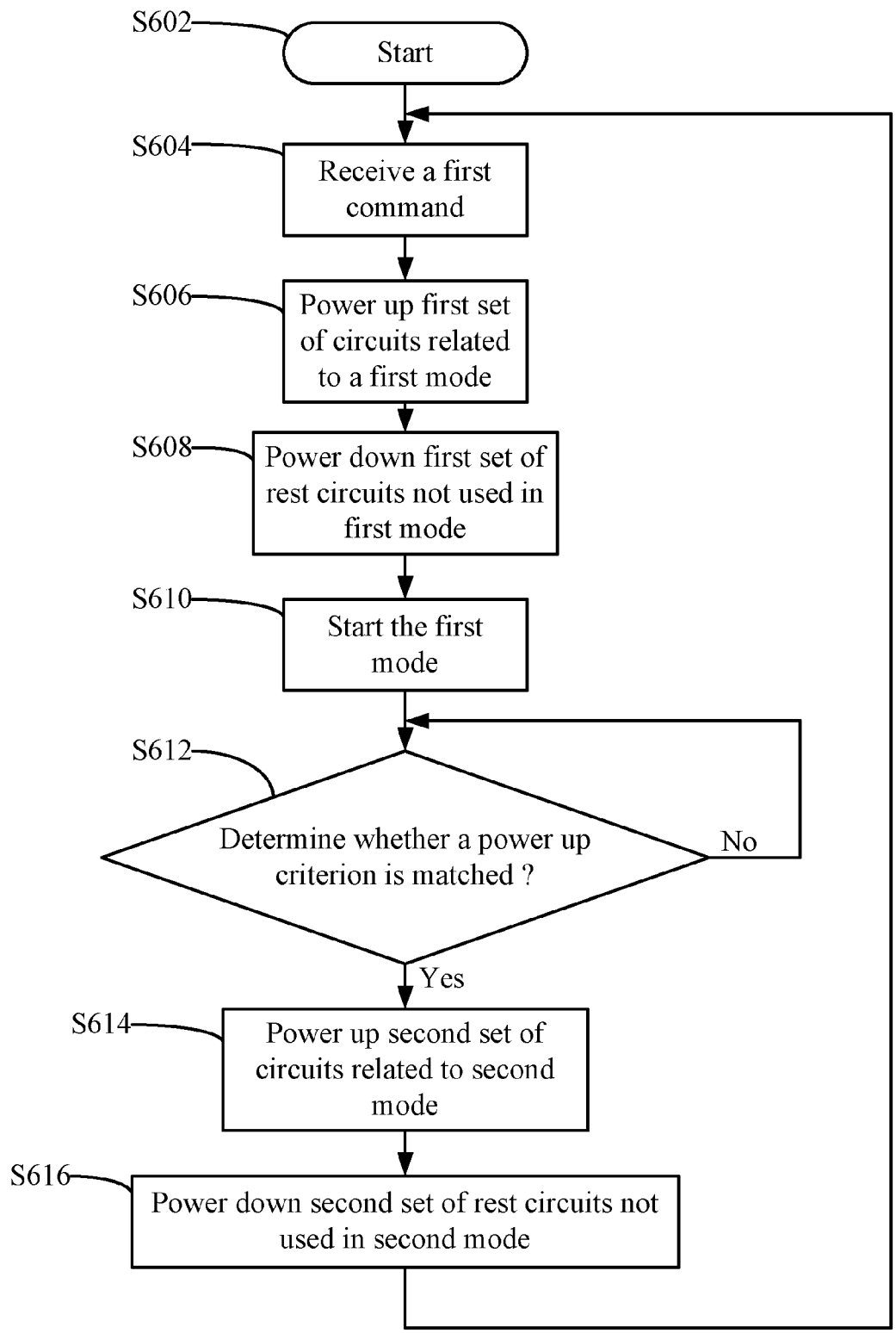
FIG. 6 illustrates a flowchart of a power saving method for controlling the power of related sets of control circuits between two different modes according to the present invention.

FIG. 6 illustrates a flowchart of a power saving method for controlling the power of corresponding circuits between a first and a second modes. The power saving method comprises following steps of:

S602 Starting a power control procedure.

S604 The power controlling unit 108 receives a first operation mode command from the central processing unit 102.

S606 The power controlling unit 108 issues a power up signal to power up a first set of control circuits related to the first operation mode in order to be ready for starting the first operation mode. The first set of control circuits related to the first operation mode are differentiated by the logic unit 160, which is preset by the power controlling unit 108. The logic unit 160 is capable of determining to power down the sets of control circuits not being used in a specific operation mode according to the different commands. Similarly, the logic unit 160 is also capable of determining to power up the sets of control circuits needed in a specific operation mode.

S608 The power controlling unit 108 issues a power down signal to power down the first set of rest control circuits not used in the first operation mode. The first set of rest control circuits not used in the first operation mode are differentiated by the logic unit 160.

S610 The power saving system 10 starts to execute the first operation mode.

S612 The power controlling unit 108 monitors a power up criterion, such as a number of remaining tracks of the optical disk. The power control procedure will go forward to the step S614 if the power up criterion is matched, such as the number of remaining tracks is less than a threshold value, otherwise the power controlling unit 108 continues monitoring the power up criterion.

S614 A second set of control circuits related to a second operation mode are powered up by the power controlling unit 108 in order to be ready for starting the second operation mode.

S616 The second set of rest control circuits not used in the second operation mode are powered down by the power controlling unit 108 when the first mode is finished, and the power control procedure goes backward to step S604.

In step S608, the time point for powering down the first set of rest control circuits not being used in the first operation mode can be determined by delaying a predetermined period from the time point of issuing the power up signal to power up the first set of control circuits related to the first operation mode. Therefore, the first set of rest control circuits not being used in the first operation mode are powered down after the predetermined period ends. In other words, the second operation mode is finished when the predetermined period ends. The predetermined period can be predetermined according to the length of warm-up time of first set of control circuits related to the first mode. Alternatively, the time point for powering down the first set of rest control circuits not being used in the first operation mode also can be determined when the power controlling unit 108 receives a signal for indicating that the first operation mode is started.

The power up criterion is predetermined according to the characteristic of different operation modes. For example, the power up criterion can be realized by counting the remaining tracks when a Seek mode is interchanges with a Following mode. The power up criterion is used to power up the next set of control circuits related to the next operation mode in advance due to the warm-up time of related circuits of corresponding operation mode. Further, for another example, the power up criterion can be realized by counting the remaining steps for a step motor of a pick-up head. The remaining steps means how far the pick up head can reach the target position and the operation mode would be changed in the target position. Suppose that the warm-up time of specific set of control circuits is 0.2 ms (minisecond) and a step update rate of step motor is 500 Hz, it means that the specific set of control circuits should be warmed up before last remaining step is transmitted. It should be noted that the power up criterion can be varied according to different characteristic of operation modes.

Figure 7:
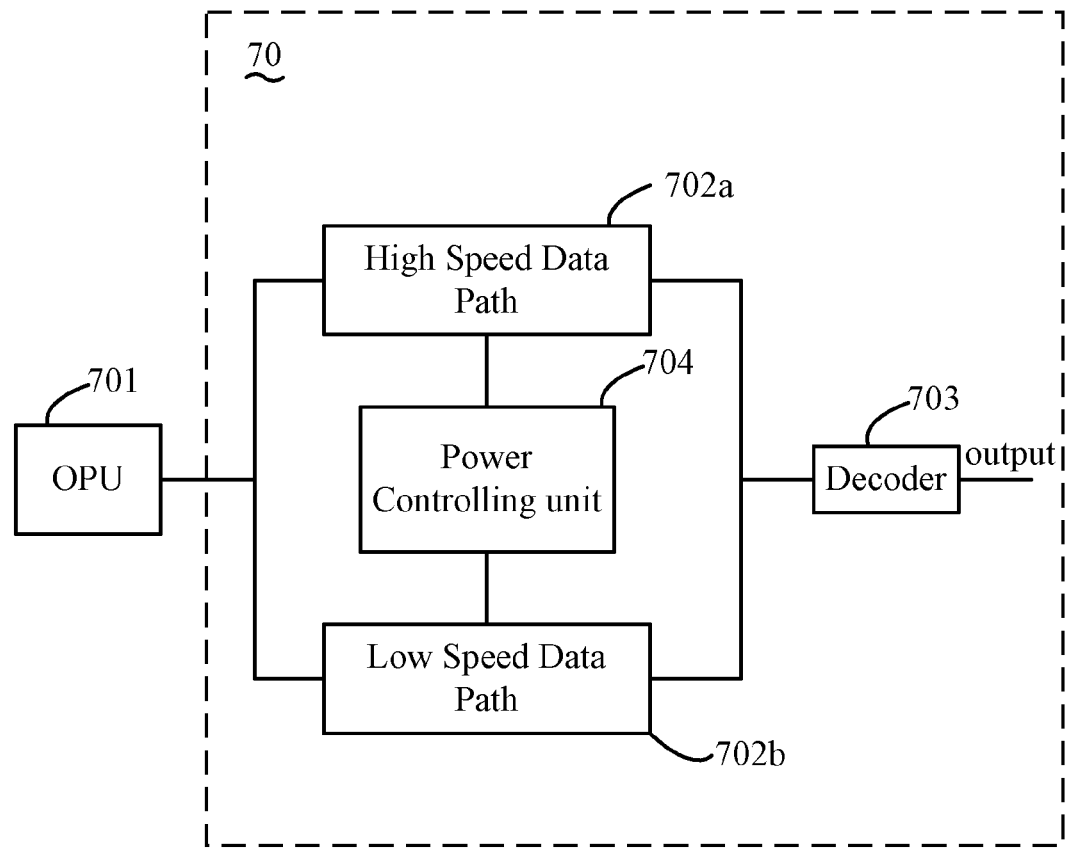
FIG. 7 illustrates block diagram of a power saving system applied in an optical disc drive according to one embodiment of the present invention.

In another aspect, as the optical disc drive can provide different rates for reading or recording operation, the power saving scheme can be performed according to the operation rates of the optical disc drive. Generally, the optical disc drive can operate at a normal rate (1×), or at an accelerated rate. The accelerated rate is typically a multiple of the normal rate (1×), ranging from 2×, 4×, 8× or even up to 52× depending on different standards, where X indicates the multiplicity. Comparing to the normal rate (1×), the accelerated rate means faster rolling speed and faster data processing speed, thus consumes more power than the normal rate (1×). Therefore, according to the present invention, the optical disc drive can use different circuits for different operation rates to save power. FIG. 7 illustrates block diagram of a power saving system 70 applied in an optical disc drive according to one embodiment of the present invention. The power saving system 70 connects to an optical pickup unit (OUP) 701 and comprises a high speed data path 702a adapted for high rate operation, a low speed data path 702b adapted for low rate operation, a decoder 703 and a power controlling unit 704. Take the reading procedure for example, the OPU 701 reads data from the disc. The read data is then transmitted to the decoder 703 through the data path. Before the transmission, the power controlling unit 704 sends a signal to power on one of the high speed data path 702a and the low speed data path 702b, and power off the other according to the operation rate of the optical disc drive. When the optical disc drive is operating at a high rate, the high speed data path 702a will be powered on to realize a faster transmission and the low speed data path 702b will be powered off, while the optical disc drive is operating at a low rate, the low speed data path 702b will be powered on and the high speed data path 702a will be powered off to reduce the power consumption. For example, assume the optical disc drive can switch between two rates, when the rate is higher than 2×, the high speed data path 702a is powered on and the low speed data path 702b is powered off, and when the rate is below 2×, the low speed data path 702b will be powered on and the high speed data path 702a will be powered off. In this embodiment, the power saving system adapts different power consumption circuits in different modes, such as a high speed data path in high speed mode, or a low speed data path in low speed mode. In another embodiment, the power saving system may adapt only one data path and the data path may adapt some circuits that only used in High speed mode but malfunction in low speed mode, so those circuits can be power off when the optical disc drive operates in low speed mode. In another embodiment, the power saving system may adapt only one data path and the data path may adapt some circuits that only used in low speed mode but malfunction in high speed mode, so those circuits can be power off when the optical disc drive operates in high speed mode.

Figure 8:
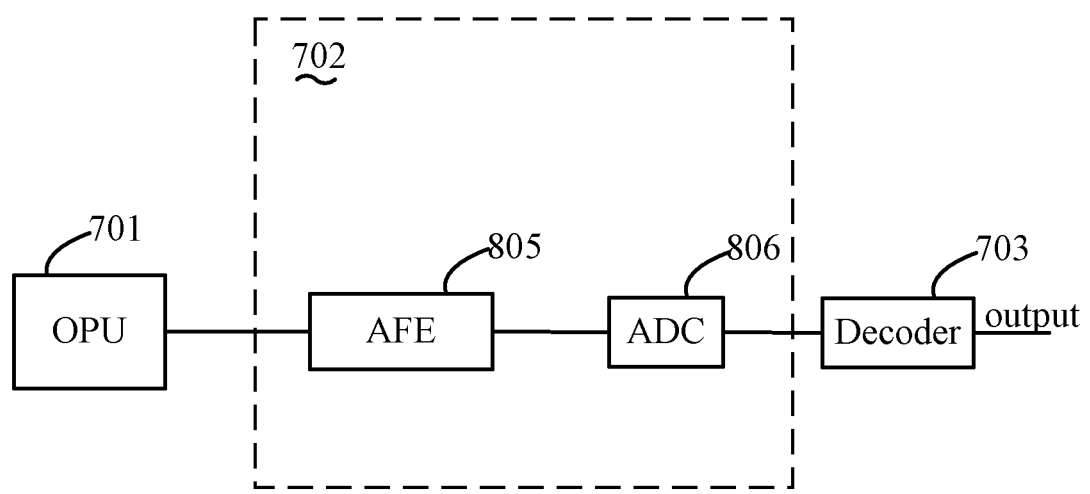
FIG. 8 illustrates block diagram of a data path used in the power saving system according to one embodiment of the present invention.

FIG. 8 illustrates block diagram of a data path 702 used in the power saving system 70 according to one embodiment of the present invention. The data path 702 at least comprises an analog front end (AFE) 805 and an analog-to-digital convertor (ADC) 806. As shown in FIG. 8, the signal read from the OPU 701 should be processed by AFE and ADC before transmission to the decoder 703. In one embodiment, the high speed data path 702*a* comprises a high speed AFE and/or a high speed ADC, the low speed data path 702*b* comprises a low speed AFE and/or a low speed ADC. In another embodiment, the AFE and the ADC may have circuits only used in one operation mode, which means the circuits can be power off when they are not used.

Figure 9:
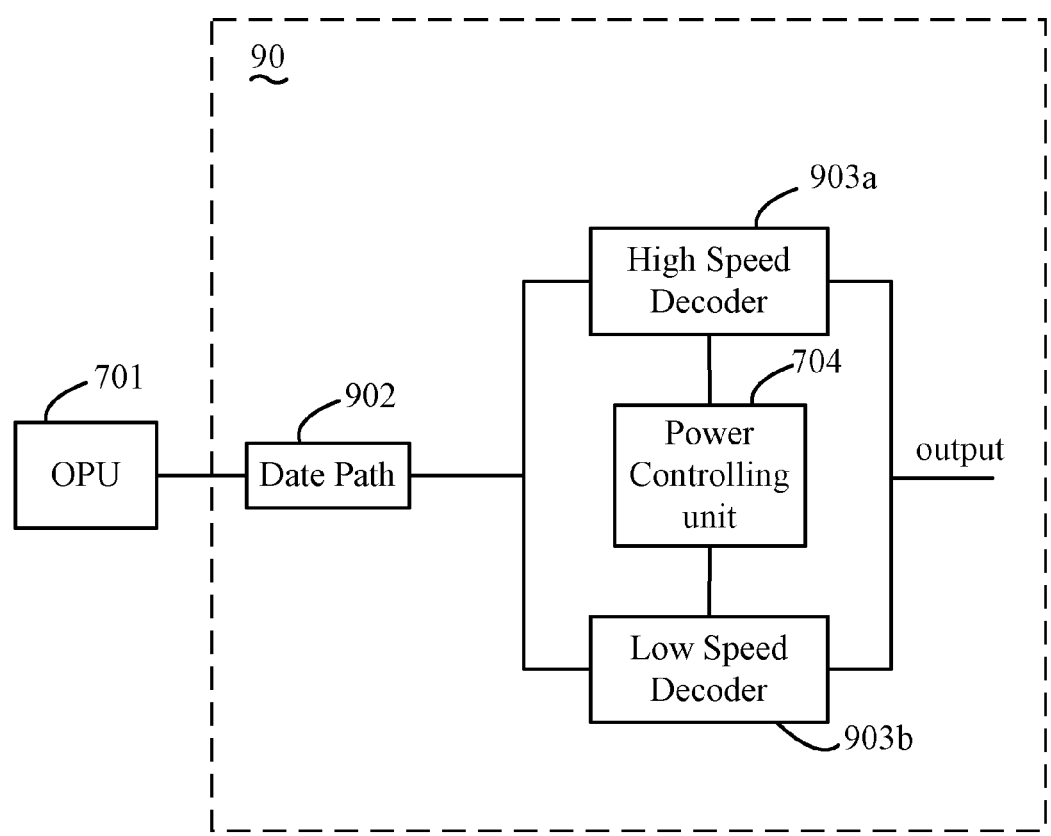
FIG. 9 illustrates block diagram of a power saving system applied in an optical disc drive according to one embodiment of the present invention.

FIG. 9 illustrates block diagram of a power saving system applied in an optical disc drive according to one embodiment of the present invention. The power saving system 90 connects to an optical pickup unite (OUP) 701 and comprises data path 92, high speed decoder 903*a* adapted for high rate operation, low speed decoder 903*b* adapted for low rate operation and power controlling unit 704. Before the decoding, the power controlling unit 704 sends a signal to power on one of the high speed decoder 903*a* and the low speed decoder 903*b*, and power down the other according to the rate of the optical disc drive. For example, when the optical disc drive is operating at a high rate, the high speed decoder 903*a* will be powered on to realize a faster processing and the low speed decoder 903*b* will be powered down, while the optical disc drive is operating at a low rate, the low speed decoder 903*b* will be powered on and the high speed decoder 903*a* will be powered down to reduce the power consumption. In this embodiment, the power saving system adapts different power consumption circuits in different modes, such as a high speed decoder in high speed mode, or a low speed decoder in low speed mode. In another embodiment, the power saving system may adapt only one decoder and the decoder may adapt some circuits that only used in high speed mode but malfunction in low speed mode, so those circuits can be power off when the optical disc drive operates in low speed mode. In another embodiment, the power saving system may adapt only one decoder and the decoder may adapt some circuits that only used in low speed mode but malfunction in high speed mode, so those circuits can be power off when the optical disc drive operates in high speed mode.

It should be noted that the power controlling unit 704, comprises same circuits to the power controlling unit 108, is capable of warming up the circuits should be used at the oncoming operation rate, and the warm-up time of circuit depends on the inherent characteristic of the specific circuit. The specific circuit should be powered up before associated operation rate starts in order to maintain the smooth operation of the optical disk drive. The problem of warm-up time of circuit can be overcome by advancing the powering up a predetermined period of time. Alternatively, it can be done by counting the remaining tracks for current operation rate. Additionally, the warm-up time of circuit can be achieved by counting the remaining segments being processed at the current operation rate.

Figure 10:
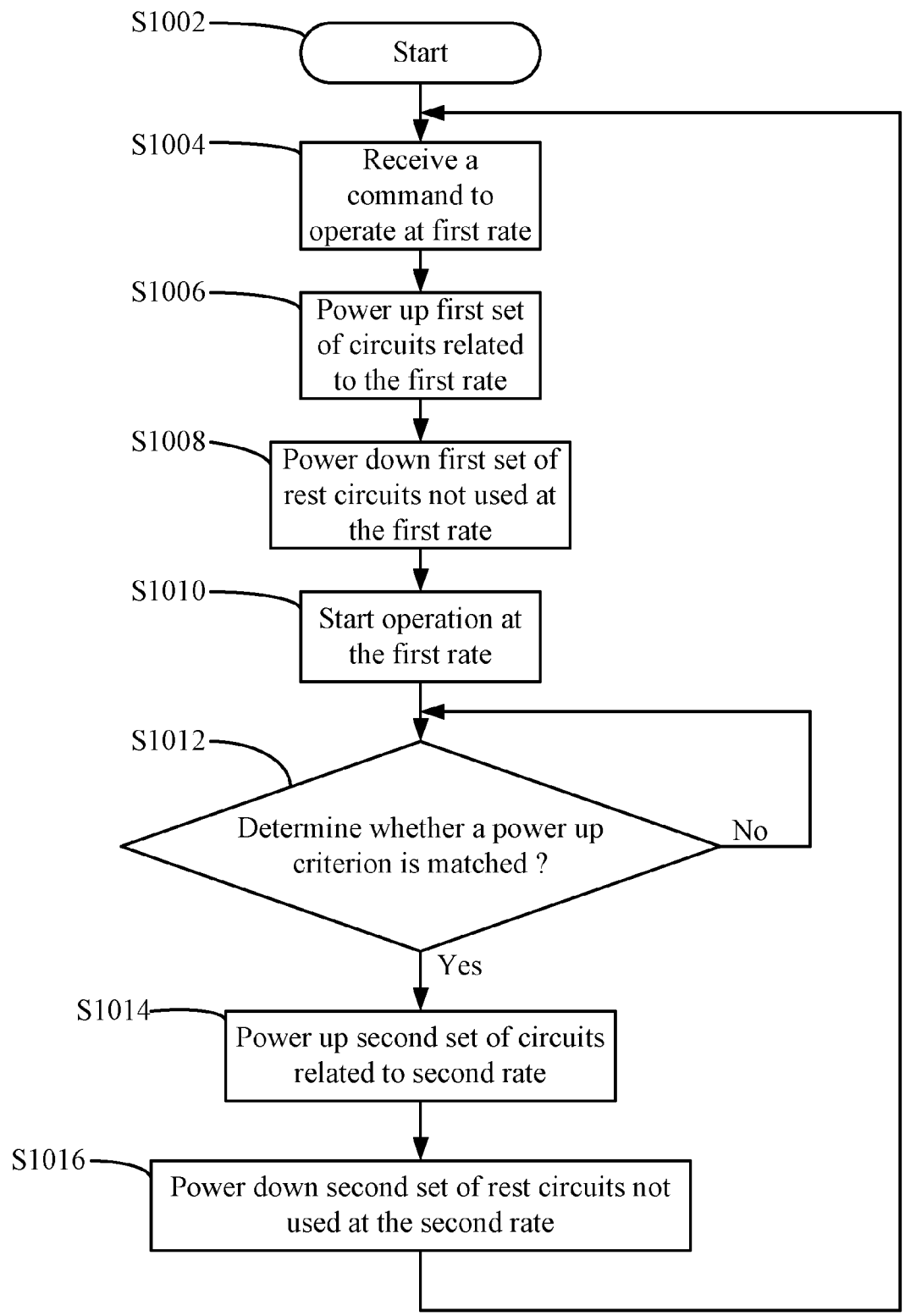
FIG. 10 illustrates a flowchart of another power saving method for controlling the power of related sets of circuits between two different rates according to one embodiment of the present invention.

FIG. 10 illustrates a flowchart of another power saving method for controlling the power of related sets of circuits between two different rates according to one embodiment of the present invention. The power saving method comprises following steps of:

S1002 Starting a power control procedure.

S1004 The power controlling unit 704 receives a command from a central processing unit to operate at a first operation rate.

S1006 The power controlling unit 108 issues a power up signal to power up a first set of circuits related to the first operation rate in order to be ready for starting the first operation rate. The first set of circuits related to the first operation rate are differentiated by the logic unit 160, which is preset by the power controlling unit 704.

S1008 The power controlling unit 704 issues a power down signal to power down the first set of rest circuits not used at the first operation rate. The first set of rest circuits not used at the first operation rate are differentiated by the logic unit 160.

S1010 The power saving system starts the operation at the first operation rate.

S1012 The power controlling unit 704 monitors a power up criterion, such as a number of remaining tracks of the optical disk. The power control procedure goes forward to the step S1014 if the power up criterion is matched, such as the number of remaining tracks is less than a threshold value, otherwise the power controlling unit 704 continues monitoring the power up criterion.

S1014 A second set of circuits related to a second operation rate are powered up by the power controlling unit 704 in order to be ready for starting the operation at the second operation rate.

S1016 The second set of rest circuits not used at the second operation rate are powered down by the power controlling unit 704 when the operation at the first rate is finished, and the power control procedure goes backward to step S1004.

In step S1008, the time point for powering down the first set of rest circuits not being used at the first operation rate can be determined by delaying a predetermined period from the time point of issuing the power up signal to power up the first set of circuits related to the first rate. Therefore, the first set of rest circuits not being used at the first rate are powered down after the predetermined period ends. In other words, the operation at the second rate is finished when the predetermined period ends. The predetermined period can be predetermined according to the length of warm-up time of first set of circuits related to the first rate. Alternatively, the time point for powering down the first set of rest circuits not being used at the first rate also can be determined when the power controlling unit 704 receives a signal for indicating that the operation at the first operation rate is started.

The power up criterion is predetermined according to the characteristic of different operation rates. For example, the power up criterion can be realized by counting the remaining tracks when a high rate (16×) is interchanges with a low rate (8×). The power up criterion is used to power up the next set of circuits related to the next operation rate in advance due to the warm-up time of related circuits of corresponding operation rate. Further, for another example, the power up criterion can be realized by counting the remaining steps for a step motor of a pick-up head. The remaining steps means how far the pick-up head can reach the target position and the operation rate would be changed in the target position. Suppose that the warm-up time of specific set of circuits is 0.2 ms (millisecond) and a step update rate of step motor is 500 Hz, it means that the specific set of circuits should be warmed up before last remaining step is transmitted. It should be noted that the power up criterion can be varied according to different characteristic of operation rates.

Consequently, the present invention provides the power saving system and the power saving method applied in an optical disk drive. In one aspect, the power saving system and method of the present invention are adapted for powering down the sets of control circuits not being used during a specific operation mode of the optical disk drive without effecting the normal operation of the optical disk drive, in another aspect, the power saving system and method of the present invention are employed for selectively powering down circuits not used for a specific operation rate of the optical disk drive without effecting the normal operation of the optical disk drive. Therefore, the power saving system and the power saving method according to the present invention are capable of efficiently reducing the power consumption of the optical disk drive.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structure.

What is claimed is:

1. A power saving system of an optical disk drive, comprising:
   a first set of circuits, which are powered up when the optical disk drive is operating at a first operation rate;
   a second set of circuits, which are not used when the optical disk drive is operating at the first operation rate; and
   a power controlling unit, coupling to the first set of circuits and the second set of circuits, for powering up the first set of circuits according to the first operation rate of the optical disk drive and powering down the second set of circuits;
   wherein the first set of circuits comprise a high speed analog front end, and the second set of circuits comprises a low speed analog front end.

2. The power saving system of claim 1, wherein the power control unit determines a predetermined time that is equal to a warm-up time of the first set of circuits; and powers up the first set of circuits at the predetermined time before the optical disc drive operated at the operation rate.

3. The power saving system of claim 1, wherein the warm-up time of the first set of circuits is whether a number of remaining step for a step motor of a pick-up head is less than a threshold value.

4. A power saving system of an optical disk drive, comprising:
   a first set of circuits, which are powered up when the optical disk drive is operating at a first operation rate;
   a second set of circuits, which are not used when the optical disk drive is operating at the first operation rate; and
   a power controlling unit, coupling to the first set of circuits and the second set of circuits, for powering up the first set of circuits according to the first operation rate of the optical disk drive and powering down the second set of circuits;
   wherein the first set of circuits comprises a high speed decoder and the second set of circuit comprises a low speed decoder.

5. A power saving system of an optical disk drive, comprising:
   a first set of circuits, which are powered up when the optical disk drive is operating at a first operation rate;
   a second set of circuits, which are not used when the optical disk drive is operating at the first operation rate; and
   a power controlling unit, coupling to the first set of circuits and the second set of circuits, for powering up the first set of circuits according to the first operation rate of the optical disk drive and powering down the second set of circuits;
   wherein the first set of circuits comprise a low speed analog front end, and the second set of circuits comprises a high speed analog front end.

6. A power saving system of an optical disk drive, comprising:
   a first set of circuits, which are powered up when the optical disk drive is operating at a first operation rate;
   a second set of circuits, which are not used when the optical disk drive is operating at the first operation rate; and
   a power controlling unit, coupling to the first set of circuits and the second set of circuits, for powering up the first set of circuits according to the first operation rate of the optical disk drive and powering down the second set of circuits;
   wherein the first set of circuits comprises a low speed decoder and the second set of circuit comprises a high speed decoder.

* * * * *